US009787082B2

(12) United States Patent
Luebke et al.

(10) Patent No.: US 9,787,082 B2
(45) Date of Patent: Oct. 10, 2017

(54) SYSTEM AND METHOD FOR ADJUSTING THE TRIP CHARACTERISTICS OF A CIRCUIT BREAKER

(71) Applicant: Eaton Corporation, Cleveland, OH (US)

(72) Inventors: Charles J. Luebke, Hartland, WI (US); Thomas J. Schoepf, Whitefish Bay, WI (US)

(73) Assignee: Eaton Corporation, Cleveland, OH (US)

( * ) Notice: Subject to any disclaimer, the term of this patent is extended or adjusted under 35 U.S.C. 154(b) by 880 days.

(21) Appl. No.: 14/098,727

(22) Filed: Dec. 6, 2013

(65) Prior Publication Data
US 2015/0162157 A1 Jun. 11, 2015

(51) Int. Cl.
| | |
|---|---|
| H01H 77/10 | (2006.01) |
| H04B 3/54 | (2006.01) |
| H02H 3/38 | (2006.01) |
| H02H 3/08 | (2006.01) |
| H02J 13/00 | (2006.01) |
| H02J 3/14 | (2006.01) |
| H02J 3/38 | (2006.01) |
| H01H 83/20 | (2006.01) |
| H02J 3/00 | (2006.01) |

(52) U.S. Cl.
CPC .............. *H02H 3/38* (2013.01); *H01H 83/20* (2013.01); *H02H 3/08* (2013.01); *H02J 3/005* (2013.01); *H02J 3/14* (2013.01); *H02J 3/383* (2013.01); *H02J 13/002* (2013.01); *H02J 13/0006* (2013.01); *H02J 13/0062* (2013.01); *H04B 3/54* (2013.01); *Y02E 10/563* (2013.01); *Y02E 40/72* (2013.01); *Y04S 10/123* (2013.01); *Y10T 307/944* (2015.04)

(58) Field of Classification Search
CPC ....... H02H 3/38; H01H 83/20; H02J 13/0006; H02J 3/005; H02J 3/383; H02J 13/002; H02J 3/14; H02J 13/0062; H04B 3/54; Y02E 10/563; Y02E 40/72; Y04S 10/123; Y10T 307/944
USPC ....................................................... 307/140
See application file for complete search history.

(56) References Cited

U.S. PATENT DOCUMENTS

| | | | |
|---|---|---|---|
| 4,428,022 A | 1/1984 | Engel et al. | |
| 5,525,985 A | 6/1996 | Schlotterer et al. | |
| 5,600,524 A * | 2/1997 | Neiger | H02H 3/335 361/115 |
| 5,910,760 A | 6/1999 | Malingowski et al. | |
| 6,144,271 A | 11/2000 | Mueller et al. | |
| 8,213,144 B2 * | 7/2012 | Papallo | G06F 1/12 361/63 |

(Continued)

*Primary Examiner* — Adi Amrany
*Assistant Examiner* — Michael Warmflash
(74) *Attorney, Agent, or Firm* — Eckert Seamans; Philip Levy; Grant Coffield

(57) ABSTRACT

An electrical system includes (1) a distributed power source device structured to generate: (i) AC power, and (ii) a signal indicating an amount of current being produced by the distributed power source device, and (2) a circuit breaker having set trip characteristics coupled to distributed power source device, wherein the circuit breaker is structured to receive the signal and adjust the set trip characteristics (e.g., the trip curve) based on at least the signal from the distributed power source device.

21 Claims, 7 Drawing Sheets

(56) References Cited

U.S. PATENT DOCUMENTS

| | | | | |
|---|---|---|---|---|
| 8,564,922 B1* | 10/2013 | Smith | ............... | H02H 3/006 |
| | | | | 340/652 |
| 2007/0213879 A1* | 9/2007 | Iwamura | ............ | H04B 3/54 |
| | | | | 700/292 |
| 2009/0184835 A1* | 7/2009 | Deaver, Sr. | ............ | G08B 25/06 |
| | | | | 340/660 |
| 2010/0198535 A1* | 8/2010 | Brown | ............ | G01R 22/063 |
| | | | | 702/62 |
| 2013/0141040 A1* | 6/2013 | DeBoer | ............ | B60L 11/1838 |
| | | | | 320/109 |
| 2014/0088780 A1* | 3/2014 | Chen | ............ | G05F 1/66 |
| | | | | 700/295 |

\* cited by examiner

SYSTEM AND METHOD FOR ADJUSTING THE TRIP CHARACTERISTICS OF A CIRCUIT BREAKER

BACKGROUND

Field

The disclosed concept relates generally to electrical systems that employ distributed power sources, and, in particular, to a system and method for adjusting the trip characteristics of a circuit breaker in an electrical system having current limited distributed power sources, such as a branch circuit that includes one or more current limited distributed power sources and, in some instances, one or more loads.

Background Information

A distributed power source is a small-scale power generation mechanism used to provide an alternative to or an enhancement of the traditional electric power system. Distributed power sources include, for example and without limitation, photovoltaic (PV) modules, wind turbine modules, backup generators, energy storage, and uninterruptible power supplies.

The National Electric Code (NEC) presently requires a distributed power source to be located on a dedicated branch circuit (i.e. without any loads on the same branch circuit or subpanel). This is done to ensure that the circuit breaker for that branch circuit is rated to protect the branch circuit wiring from any overcurrent conditions, regardless of the power source.

It would be advantageous to be able to use existing electrical infrastructure (panel boards, load centers, wiring, etc.) to locate and connect current limited distributed power sources on the same (non-dedicated) branch circuit as loads. This would be of particular interest for distributed generation systems and microgrids as well as for Building Integrated PV (BIPV) systems which include microinverters typically in the form of distributed plug inverters (DPIs). The problem is that in such a configuration, the trip curve of the branch circuit breaker, which determines the amount of time required for the circuit breaker to trip at a given overcurrent level, needs to be adjusted to compensate for the distributed power sources being present on the same non-dedicated circuit (e.g., plugged into receptacles). Currently, there is no efficient way for making such adjustments.

SUMMARY

These needs and others are met by embodiments of the disclosed concept, which are, in one embodiment, directed to an electrical system that includes (1) a distributed power source device structured to generate: (i) AC power, and (ii) a signal indicating an amount of current being produced by the distributed power source device, and (2) a circuit breaker having set trip characteristics coupled to distributed power source device, wherein the circuit breaker is structured to receive the signal and adjust the set trip characteristics (e.g., the trip curve) based on at least the signal from the distributed power source device.

In another embodiment, a method of adjusting the trip characteristics of a circuit breaker is provided that includes receiving in the circuit breaker a signal indicating the amount of current being produced by a distributed power source device structured to generate AC power, and adjusting the trip characteristics (e.g., the trip curve) based on at least the signal from the distributed power source device.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
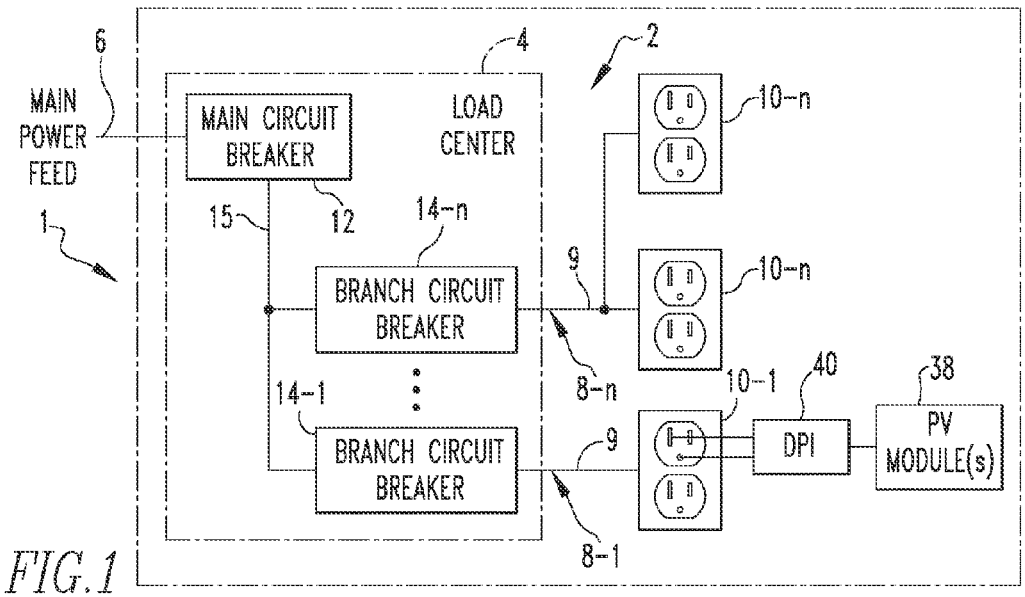
FIG. 1 is a schematic diagram of an electrical system provided at a location such as, without limitation, a residence or other building, according to one exemplary embodiment of the present invention.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the term "default ampacity rating" shall mean the maximum continuous current a circuit breaker is designed to carry without tripping.

As employed herein, the term "set ampacity rating" shall mean the maximum continuous current that a circuit breaker can carry without tripping for a given continuous current setting. As will be appreciated, "set ampacity rating" applies to those circuit breakers that have a continuous current adjustment, and the "set ampacity rating" will be some percentage of the "default ampacity rating."

As employed herein, the term "trip curve" shall mean a plot of time (y-axis) versus current (x-axis) that shows how fast a circuit breaker will trip at any magnitude of current.

As employed herein, the term "backfed" shall mean that an AC power source is connected to the load side of a circuit breaker and power is delivered to the line side through the separable contacts of the circuit breaker.

In one embodiment, the disclosed concept provides a system and method for adjusting the trip characteristics (e.g., trip curve) of a branch circuit breaker on a "non-dedicated" branch circuit that includes one or more current limited distributed power sources (for example and without limitation, photovoltaic (PV) modules, wind turbine modules, backup generators, and uninterruptible power supplies) and, in some instances, one or more loads. In particular, as described in detail herein, in the exemplary embodiment the disclosed concept provides a system and method wherein the trip curve of a branch circuit breaker is automatically and dynamically adjusted based on actual available source current delivered to the non-dedicated branch circuit.

FIG. 1 is a schematic diagram of an electrical system 2 provided at a location 1 such as, without limitation, a residence or other building, according to one exemplary embodiment of the present invention. Electrical system 2 includes a load center 4 which receives AC power from a main power feed 6 (e.g., the utility power feed) and provides AC power to a number of branch circuits 8 (labeled 8-1 to 8-n) in the location 1, each comprising a number of conductors or wires 9. As seen in FIG. 1, each branch circuit 8 also includes one or more electrical receptacles 10 (labeled 10-1 to 10-n) for providing power to a load or loads (not shown) connected thereto.

As seen in FIG. 1, load center 4 includes a number of circuit breakers for protecting electrical system 2 from damage due to an overcurrent condition, such as an overload condition or a relatively high level short circuit or fault condition. As is known in the art, circuit breakers (such as molded case circuit breakers (MCCBs) typically used in switchboards and switchgear and miniature circuit breakers (MCBs) typically used in load centers and panelboards) typically include separable contacts which may be operated either manually by way of a handle disposed on the outside of the case or automatically in response to an overcurrent condition. In addition, such circuit breakers typically also include: (i) an operating mechanism which is designed to rapidly open and close the separable contacts, and (ii) a trip unit which senses overcurrent conditions in an automatic mode of operation. Upon sensing an overcurrent condition, the trip unit trips the operating mechanism to a trip state, which moves the separable contacts to their open position.

As seen in FIG. 1, the circuit breakers of load center 4 include a main circuit breaker 12 and a number of branch circuit breakers 14 (labeled 14-1 to 14-n). Main circuit breaker 12 is connected to main power feed 6. The output of main circuit breaker 12 is coupled to a busbar 15. The input of each of the branch circuit breakers 14 is coupled to busbar 15, and the output of each of the branch circuit breakers 14 is coupled to the conductors or wires 9 of the associated branch circuit 8. Branch circuit breakers 14 thus functions to individually protect each of the branch circuits 8 from overcurrent conditions.

According to an aspect of the present invention, at least branch circuit breaker 14-1 comprises a configurable circuit interrupter with a dynamically adjustable trip curve having the structure shown in FIGS. 2 and 3 (described below). It will be understood, however, that the other branch circuit breakers 14 and/or main circuit breaker 12 may or may not also have the same structure.

Figure 2:
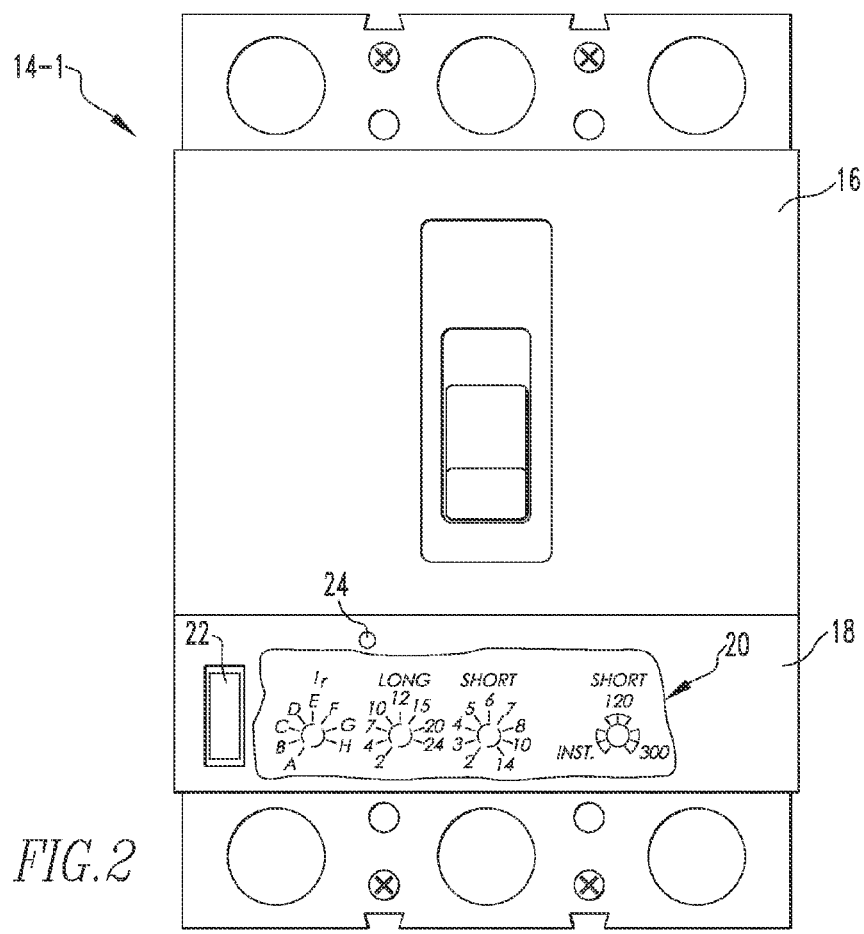
FIG. 2 is a schematic diagram of a branch circuit breaker of the system of FIG. 1 according to the exemplary embodiment of the present invention

Referring to FIG. 2, which is a schematic diagram of branch circuit breaker 14-1 according to the exemplary, non-limiting embodiment of the present invention, branch circuit breaker 14-1 comprises a configurable circuit interrupter (in the form of an MCCB in the illustrated embodiment, although it will be understood that configurable circuit interrupter may also be in the form of an MCB or another suitable circuit interrupting device) having an operating mechanism 16 configured to rapidly open and close the separable contacts (not shown) of branch circuit breaker 14-1 and an electronic trip unit 18 operatively coupled to operating mechanism 16 which, in an automatic mode of operation, is structured to sense overcurrent conditions and in response thereto move operating mechanism 16 to a state wherein the separable contacts of branch circuit breaker 14-1 are open. As seen in FIG. 2, in the illustrated embodiment, electronic trip unit 18 includes a number of adjustable switches 20 for varying the functional trip settings (such as, for example and without limitation, long delay pickup (Ir), long delay time (LDT), short delay pickup (SDPU), ground fault pickup (GFPU), and short delay time and ground fault time (SDT/GFT)) of electronic trip unit 18. In the illustrated embodiment, electronic trip unit 18 also includes a Serial Port Interface (SPI) 22 and a trip unit status indicator 24 (in the form of an LED).

Figure 3:
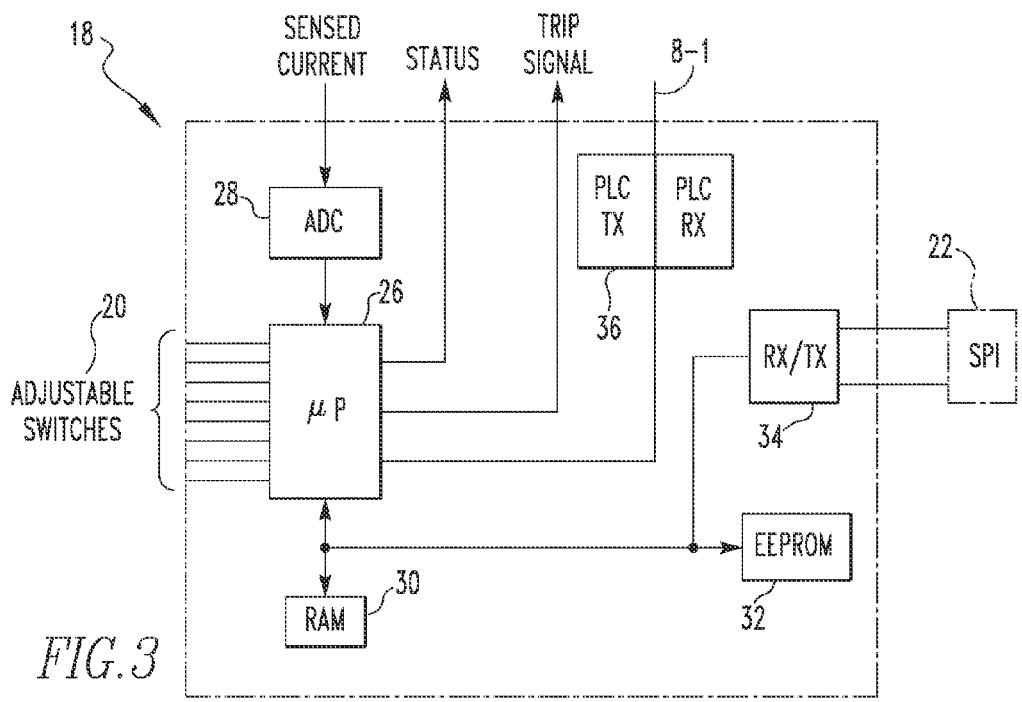
FIG. 3 is a schematic diagram showing certain selected components of an electronic trip unit forming part of the branch circuit breaker of FIG. 2 according to the exemplary embodiment.

FIG. 3 is a schematic diagram showing certain selected components of electronic trip unit 18 according to the exemplary embodiment. As seen in FIG. 3, electronic trip unit 18 includes a microprocessor (μP) 26 which controls the operation of electronic trip unit 18. Alternatively, microprocessor 26 may be another type of processing or control unit, such as, without limitation, a microcontroller or some other suitable processing device. Electronic trip unit 18 further includes an analog-to-digital converter (ADC) 28, a random access memory (RAM) 30 and an EEPROM 32, each of which is coupled to microprocessor 26. ADC 28 is structured to receive signals, such as a number of current signals (indicating the current of the circuit to which branch circuit breaker 14-1 is connected), that are sensed by sensors (not shown; e.g., a number of current transformers or Rogowski coils) forming part of branch circuit breaker 14-1 and convert those signals to digital data that is appropriate for microprocessor 26. As will be appreciated, that data may be stored in RAM 30 and/or used by the trip unit program implemented in and run by microprocessor 26 in determining whether and when to issue a trip signal for tripping operating mechanism 16. In addition, in the exemplary embodiment, EEPROM 32 stores (in nonvolatile memory) the functional trip settings (such as, for example and without limitation, long delay pickup (Ir), long delay time (LDT), short delay pickup (SDPU), ground fault pickup (GFPU), and short delay time and ground fault time (SDT/GFT)) of electronic trip unit 18 which define the operating characteristics of thereof, and which are read into microprocessor 26 as needed by the trip unit program. Electronic trip unit 18 also includes a communication interface 34 coupled to serial port interface (SPI) 22, which in turn is operatively coupled to microprocessor 26 to allow for serial communication with microprocessor 26. Finally, electronic trip unit 18 further includes a power line carrier (PLC) transceiver 36 coupled to branch circuit 8-1. PLC transceiver 36 is also coupled to microprocessor 26. The function and significance of PLC transceiver 36 is described in detail elsewhere herein. In addition, as will be described below, in certain embodiments, the circuit breakers therein only need to have receive capabilities, and thus PLC transceiver 36 may be replaced by a PLC receiver, while in other embodiments the circuit breakers therein only need to have transmit capabilities, and thus PLC transceiver 36 may be replaced by a PLC transmitter. In still other embodiments, two-way communication capability is required, which is provided by PLC transceiver 36.

Referring again to FIG. 1, electrical system 2 further includes a number of PV module(s) 38. For example, PV module(s) 38 may be a PV module provided on a roof at location 1 or may be a BIPV awning, window or shutter. PV module(s) 38 is/are coupled to DPI 40, which in turn is plugged into electrical receptacle 10-1. As is known in the art, a DPI is a device that converts DC power from one or more PV modules to AC power. Another term used in the industry is microinverter. However, a DPI, such as DPI 40, differs from a standard microinverter in that a DPI has at least the following two additional features: (1) a plug connector so that it can be plugged into a branch circuit receptacle, such as electrical receptacle 10-1, and (2) a PLC output signal (comprising a number of pulses) that indicates the amount of power that the DPI is generating at any given time. As described in greater detail elsewhere herein, and according to an aspect of the present invention, the information in the PLC output signal is used by branch circuit breaker 14-1 to dynamically adjust the trip characteristics (e.g., trip curve) of branch circuit breaker 14-1. It should also be noted that a DPI can be associated with one PV module, or it could be a larger device that converts power from multiple PV modules. It should also be noted that in an alternative embodiment, DPI 40 (or another suitable microinverter coupled to PV module(s)) may instead be hardwired to the branch circuit (no plug connector).

Figure 4:
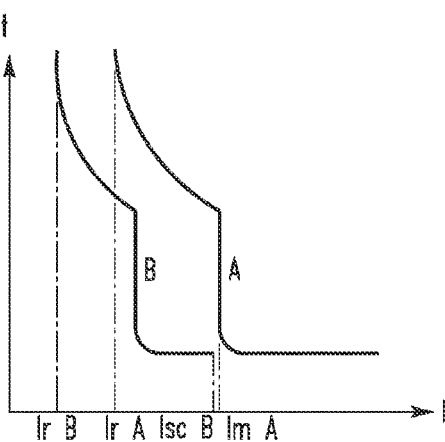
FIG. 4 illustrates a trip curve for the branch circuit breaker of FIG. 2 according to the exemplary embodiment.

As will be appreciated by those of ordinary skill in the art, branch circuit breaker 14-1 will have a default ampacity rating and a default trip curve associated with it (the default trip curve is the default "rated" trip curve for the branch circuit breaker 14-1). That default trip curve for the exemplary embodiment is shown in FIG. 4 as trip curve A. The default ampacity rating and default trip curve are selected based on the gauge size of wire 9 on the branch circuit 8-1 in order to protect wire 9 from excessive overheating and potentially causing a fire (e.g., 14AWG has a default ampacity rating of 15 A). For a conventional branch circuit, the utility service is the only power source, and the branch circuit breaker at the source end (load center) provides the overcurrent and short circuit protection for the wiring. However, when an additional power source, such as a distributed power source (e.g., PV module(s) 38 and DPI 40), is located on a branch circuit (e.g., branch circuit 8-1), it is possible that the total current from the power sources could exceed the default ampacity rating of the wiring. As a result, it is important for the total current "allowed" on the branch circuit to be limited to this value (the default ampacity rating). Since the additional power source is typically current limited, the set ampacity rating and trip curve of the branch circuit breaker should be adjusted down to reduce the overcurrent threshold of the primary utility source. In other words, if one or more distributed sources are located on the same non-dedicated branch circuit, then the set ampacity rating and trip curve on the circuit breaker can be shifted to a lower value as shown in FIG. 4 (trip curve B). Furthermore, the amount that the set ampacity rating and trip curve should be reduced is dependent on the current available from the distributed sources (i.e., the amount of current produced by the additional source(s)), so that the total current present on the branch circuit will not be any higher than the default ampacity rating (i.e., the ampacity rating of the conductor(s) of the branch circuit).

Thus, according to an aspect of the present invention, in electrical system 2, electronic trip unit 18 further includes a power line carrier (PLC) transceiver 36 coupled to branch circuit 8-1. PLC transceiver 36 is also coupled to microprocessor 26. PLC transceiver 36 is structured and configured to receive the PLC output signal of DPI 40 which, as noted above, indicates the presence of a distributed power source (i.e., DPI 40) on branch circuit 8-1 and the amount of current that is being provided by DPI 40 at any particular time. In addition, in this aspect of the present invention, electronic trip unit 18 is structured and configured to, responsive to receipt of the PLC output signal of DPI 40 in PLC transceiver 36, adjust/shift the set ampacity rating and trip curve of branch circuit breaker 14-1 (e.g., to a lower value) based on the amount of current being produced by DPI 40 by adjusting the functional trip settings/characteristics stored in EEPROM 32 (and then used by the trip routine of microprocessor 26).

Thus, during operation of electrical system 2, DPI 40 will continually output its PLC output signal which indicates the amount of current being provided thereby. In response to receipt of that signal, electronic trip unit 18, and in particular microprocessor 26 thereof, will adjust/shift the set ampacity rating and trip curve of branch circuit breaker 14-1 to ensure that the total current present on branch circuit 8-1 will not be any higher than the default ampacity rating. For example, branch circuit breaker 14-1 may have a default ampacity rating of 15 A. If DPI 40 is providing 10 A to branch circuit 8-1, this will be indicated in the PLC output signal of DPI 40 and the set ampacity rating and trip curve of branch circuit breaker 14-1 will be shifted (reduced) by 10 A such that the set ampacity rating of branch circuit breaker 14-1 will be 5 A (15 A-10 A). If for some reason the output of DPI 40 drops to 8 A, this too will be indicated in the PLC output signal of DPI 40 and the set ampacity rating and trip curve of branch circuit breaker 14-1 will be shifted (increased) by 2 A such that the set ampacity rating of branch circuit breaker 14-1 will be 7 A (15 A-8 A). Accordingly, the disclosed concept provides a system and method wherein automatic and dynamic trip curve adjustments to a branch circuit breaker may be made based on actual available source current being delivered to the branch circuit. It should be noted that the PLC signal which represents the present value of source current on the branch circuit is sent more frequently than the trip time of the branch circuit breaker, meaning that the trip curve can be adjusted more quickly than the time to trip.

In one particular exemplary implementation of system 2 of FIG. 1, the trip curve of the branch circuit breaker 14-1 is adjusted downward for the "forward" current direction (i.e., when loads are also present on the branch circuit 8-1). However, if the current through branch circuit breaker 14-1 is "reversed", meaning there is less load on the branch circuit 8-1 than the current produced PV module(s) 38 and DPI 40, then the default trip setting of branch circuit breaker 14-1 could be retained.

Figure 5:
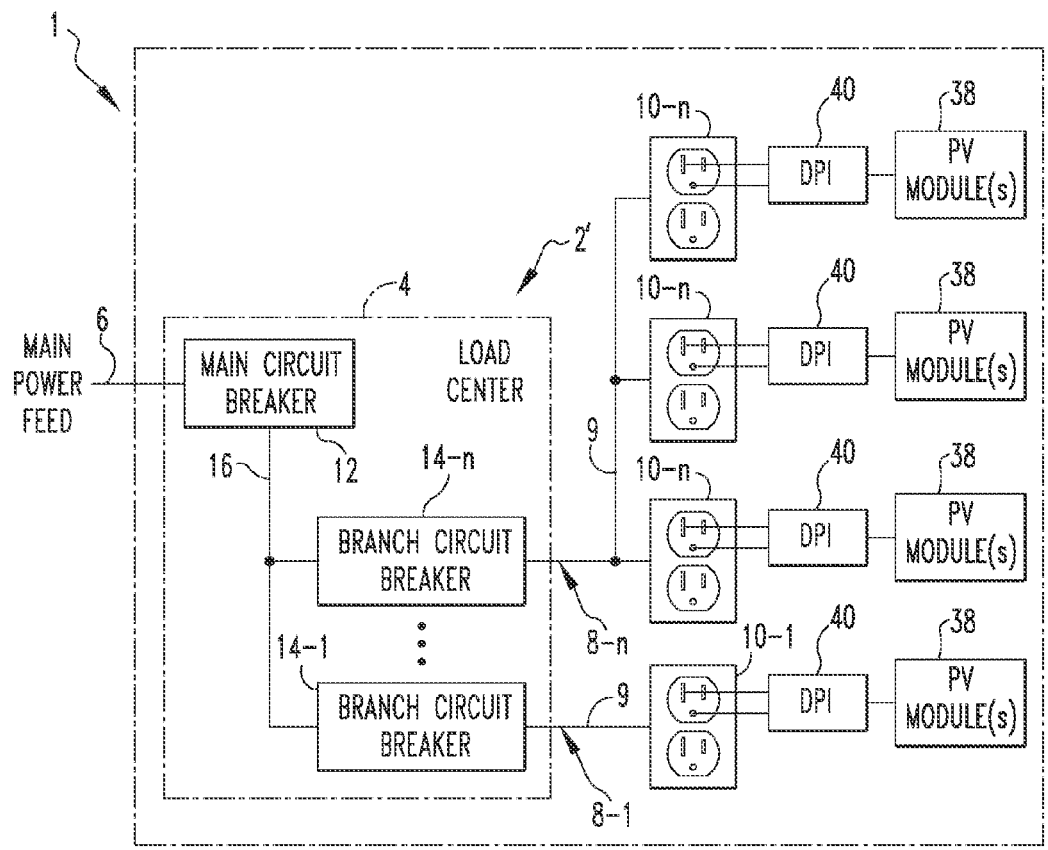
FIG. 5 is a schematic diagram of an electrical system provided at a location such as, without limitation, a residence or other building, according to an alternative exemplary embodiment of the present invention.

FIG. 5 is a schematic diagram of an electrical system 2' provided at location 1 according to an alternative embodiment. Electrical system 2' is similar to electrical system 2, and like components are labeled with like reference numerals. In electrical system 2', branch circuit breaker 14-*n* is structured and configured like branch circuit breaker 14-1 described above (FIGS. 2 and 3). In addition, in branch circuit 8-*n*, each of the three electrical receptacles 10-*n* has a DPI 40 and a PV module(s) 38 as described herein coupled thereto. For example, in one particular embodiment, PV module(s) 38 in branch circuit 8-1 may be PV module(s) provided on a roof at location 1 as described above, and PV module(s) 38 in branch circuit 8-n may each be a BIPV awning, window or shutter that are connected in parallel. In this embodiment, the amount that the set ampacity rating and trip curve of branch circuit breaker 14-n are automatically shifted will be equal to the sum of the currents being output by the DPIs 40 in branch circuit 8-n. Thus, if branch circuit breaker 14-n has a default ampacity rating of 15 A and each DPI 40 in branch circuit 8-n outputs 1 A, the set ampacity rating and trip curve of branch circuit breaker 14-n will be shifted (reduced) by 3 A (1 A+1 A+1 A) such that the set ampacity rating of branch circuit breaker 14-n will be 12 A (15 A-3 A).

Figure 6:
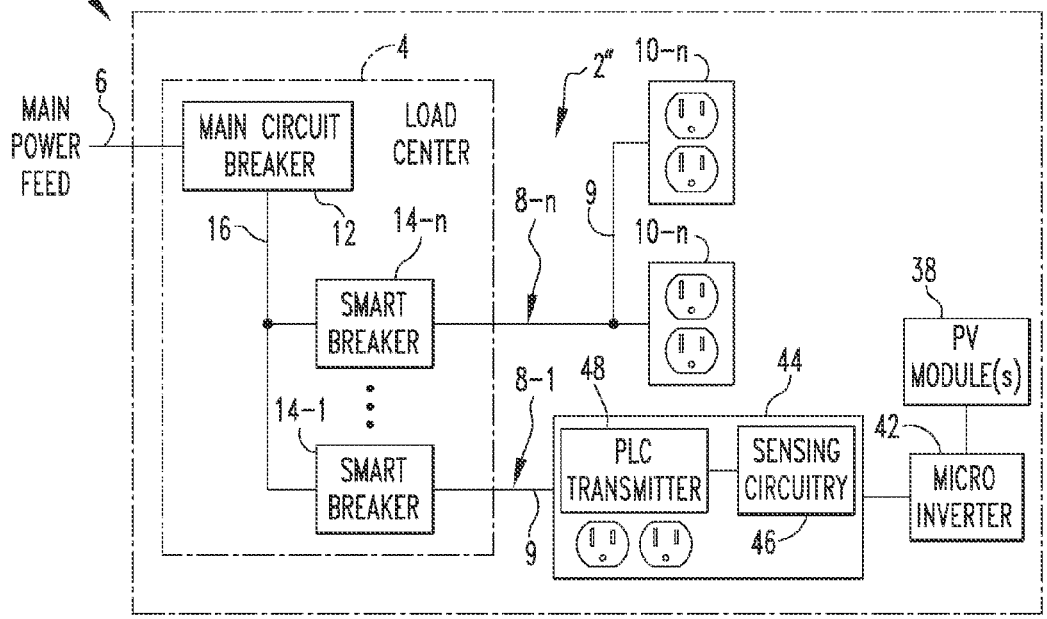
FIG. 6 is a schematic diagram of an electrical system provided at a location such as, without limitation, a residence or other building, according to another alternative exemplary embodiment of the present invention.

FIG. 6 is a schematic diagram of an electrical system 2" provided at a location 1 according to another alternative embodiment. Electrical system 2" is similar to electrical system 2, and like components are labeled with like reference numerals. In electrical system 2", however, electrical receptacle 10-1 and DPI 40 are replaced by microinverter 42 and smart receptacle 44. Smart receptacle 44 is a wiring device having the intelligence to measure and report the (reverse) source current being delivered onto branch circuit 8-1 by microinverter 42. In particular, as seen FIG. 6, smart receptacle 44 includes sensing circuitry 46 (e.g., including a number of current transformers or Rogowski coils) for measuring source current being delivered onto branch circuit 8-1, and a PLC transmitter 58 structured to output a signal (a series of pulses) that indicates the amount of current being delivered onto branch circuit 8-1 at any given time as determined by sensing circuitry 46. In all other respects, the function of electrical system 2" is the same as electrical system 2.

Figure 7:
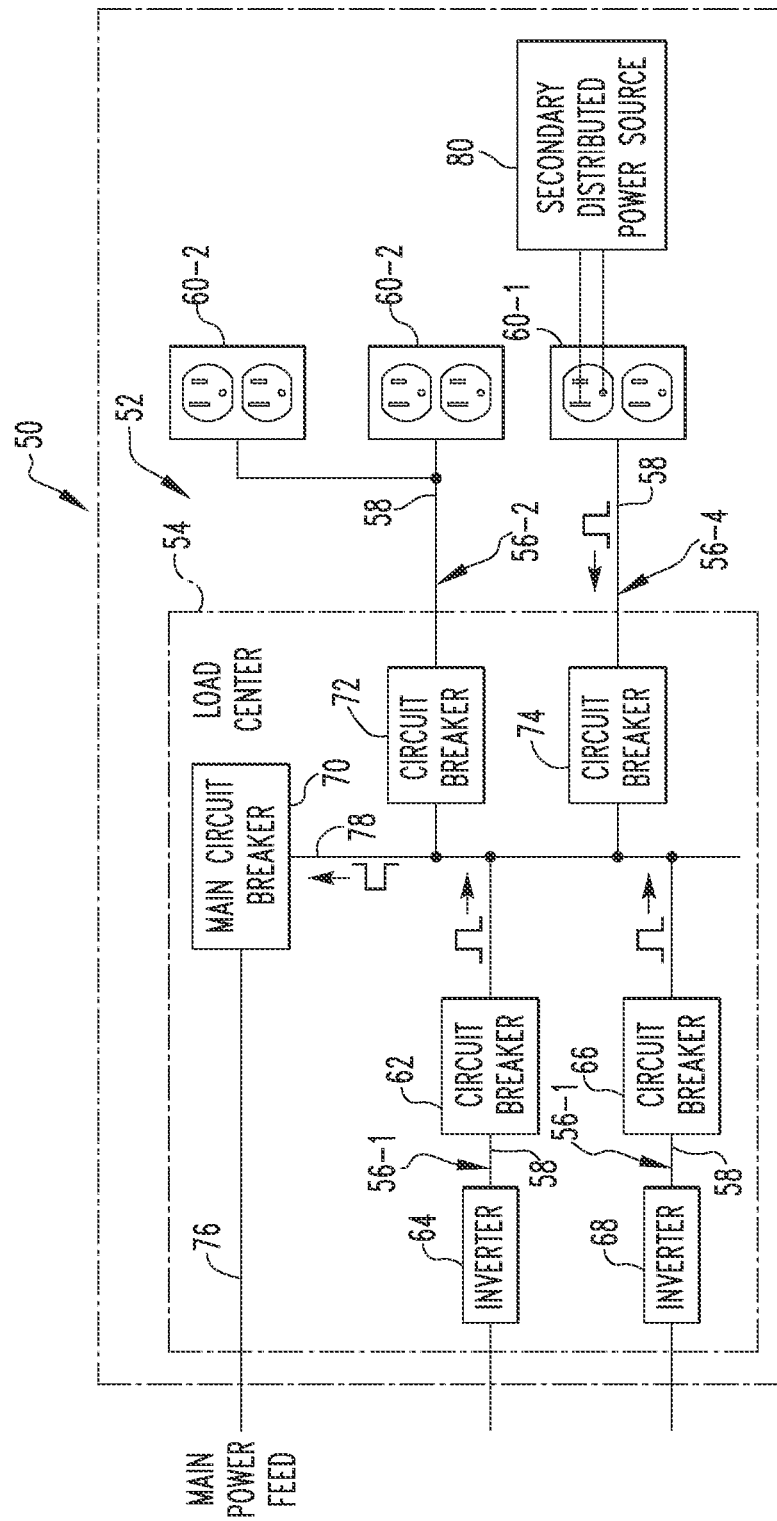
FIG. 7 is a schematic diagram of an electrical system having backfed AC sources provided at a location such as, without limitation, a residence or other building, according to yet another alternative exemplary embodiment of the present invention.

FIG. 7 is a schematic diagram of an electrical system 52 provided at a location 50 such as, without limitation, a residence or other building, according to another alternative exemplary embodiment of the present invention. Electrical system 52 includes a load center 4 configured to have secondary AC sources (described below) backfed on multiple branch circuits (labeled 56-1 to 56-4 in the present, non-limiting example embodiment) in the location 50, each comprising a number of conductors or wires 58. As seen in FIG. 7, electrical system 52 also includes one or more electrical receptacles 60 (labeled 60-1 to 60-2) for providing power to a load or loads (not shown) connected thereto.

As seen in FIG. 7, load center 54 includes circuit breaker 62 coupled to an inverter 64 (fed by a DC source such as a battery or PV module) and circuit breaker 66 coupled to an inverter 68 (fed by a DC source such as a battery or PV module). Load center 54 also include a main circuit breaker 70 and branch circuit breakers 72 and 74. Main circuit breaker 70 is connected to main power feed 76. The load side of main circuit breaker 70 is coupled to a busbar 78, and the line side of circuit breakers 62, 66, 72, 74 are coupled to busbar 78.

In the illustrated embodiment, circuit breakers 62, 66, 70 and 72 are "smart" breakers wherein at least circuit breakers 62 and 66 are configured to measure the reverse current being supplied therethrough and generate and transmit PLC output signals (comprising a number of pulses) that each indicate the respective reverse current level, circuit breaker 74 is a standard breaker where the PLC power pulse is transmitted by a DPI or a smart receptacle and passes through circuit breaker 74 to busbar 78, and at least main circuit breaker 70 comprises a configurable circuit interrupter with a PLC receiver and dynamically adjustable trip curve as described in detail elsewhere herein.

As seen in FIG. 7, electrical system 52 further includes a secondary distributed power source 80 that is coupled to electrical receptacle 60-1. Distributed power source 80 and electrical receptacle 60-1 are configured such that together they are able to output a PLC output signal (comprising a number of pulses) that indicates the current level presently being provided by distributed power source 80. In one non-limiting exemplary embodiment, distributed power source 80 comprises a PV module(s) (or another distributed power source device) coupled to a DPI. In another non-limiting exemplary embodiment, distributed power source 80 comprises a PV module(s) (or another distributed power source device) coupled to a standard microinverter, and electrical receptacle 60-1 comprises a smart receptacle (like smart receptacle 44 described elsewhere herein) for generating and transmitting the PLC output signal.

As will be appreciated by those of skill in the art, main circuit breaker 70 in this embodiment will have a default ampacity rating and a default trip curve associated with it, designed to protect busbar 78 from overcurrent conditions.

In operation, circuit breakers 62 and 66 will measure the reverse current being supplied therethrough and generate and transmit their respective PLC output signals onto busbar 78. Also, distributed power source 80 and electrical receptacle 60-1 will together output the PLC output signal through circuit breaker 74 onto busbar 78 that indicates the current level presently being provided by distributed power source 80. Those PLC output signals will be received in main circuit breaker 70. In response to receipt of that signal, main circuit breaker 70 will adjust/shift the set ampacity rating and trip curve of main circuit breaker 70 based on the sum of the current on busbar 78 indicated in the multiple PLC output signals. For example, main circuit breaker 70 may have a default ampacity rating of 100 A. If distributed power source 80 is providing 10 A, inverter 64 and circuit breaker 62 are providing 7 A, and inverter 68 and circuit breaker 66 are providing 12 A, the total is 29 A and the set ampacity rating and trip curve of main circuit breaker 70 will be shifted (reduced) by 29 A such that the set ampacity rating of main circuit breaker 70 will be 71 A.

Figure 8:
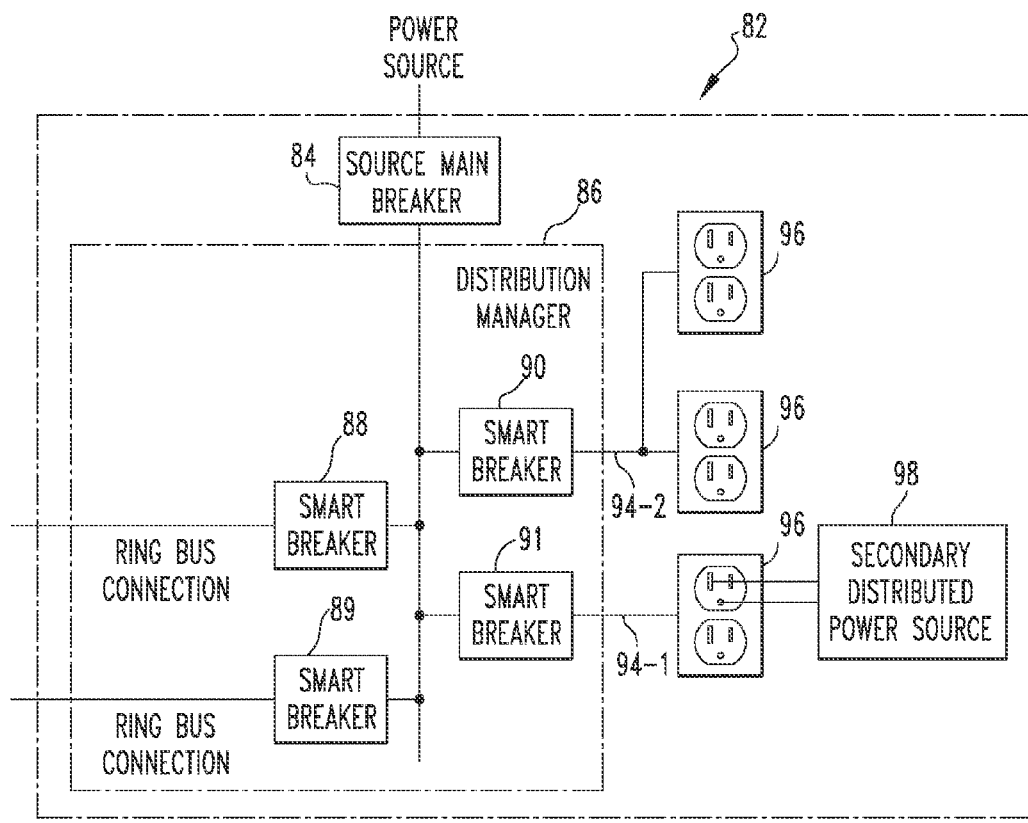
FIG. 8 is a schematic diagram of a microgrid according to still another alternative exemplary embodiment of the present invention.

The concepts described herein for adjusting the trip curve of a circuit breaker based on the power being provided by one or more distributed power sources is not limited to the embodiments shown in FIGS. 1 and 5-7, but instead may be applied to a number of other applications such as data centers or microgrids. For example, the concept may be applied to an islanded microgrid 82 as shown in FIG. 8 that includes a source main breaker 84, a distribution manager 86 having smart breakers 88 and 89 coupled to a ring bus, and smart breakers 90, 91 coupled to branch circuits 94-1 and 94-2 having electrical receptacles 96 and at least one secondary distributed power source 98.

As described herein, in the exemplary, non-limiting embodiments, the information used to adjust the trip curve of a circuit breaker is transmitted using PLC technology. There are a number of ways that such communications may be implemented. Three non-limiting examples are described below.

Figure 9:
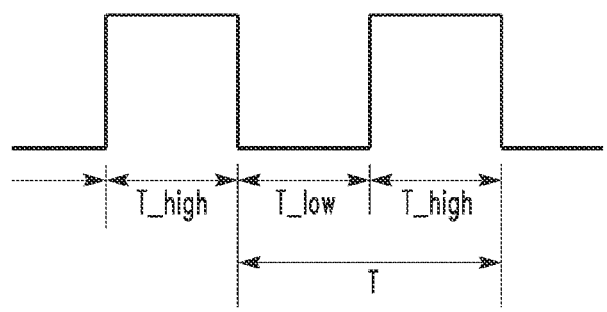
FIG. 9 is a schematic diagram of a known scheme used by power meters to send pulses at a rate corresponding to power usage.

As is known in the art, current power meters provide pulses to indicate (count) the amount of energy being generated/consumed. As shown in FIG. 9, the pulse width $T\_high$ can vary depending on the pulse output meter, but typically $T\_high=50$ ms. $T\_high$ remains a constant value during operation. The time between the pulses $T\_low$ is what indicates the power being measured by the meter.

Each pulse represents a 1000th of a KW-hr or 1 W-hr of energy passing through the meter. Thus, because 3600 seconds per hour=3600 J per pulse (i.e. 1 Whr=3600 J), instantaneous power (P) equals 3600/T, where T is the time between the falling edge of each pulse. For example, 1 A*120V=120 W delivered for 1 hour=120 W-Hr=120 pulses/hr. Thus, 1 A corresponds to T=30 sec/pulse. Similarly, 5 A corresponds to T=6 sec/pulse, and 15 A corresponds to T=2 sec/pulse.

In addition, for one known branch circuit breaker, the typical trip times (min, max) are as follows: (i) 100% rated current: (must not trip, UL489 requirement); (ii) 135% rated current: (must trip<1 hour, UL489 requirement); (iii) 200% rated current: (10 sec to 100 sec); and (iv) 500% rated current: (1.5 sec to 5 sec).

If a 15 A rated branch circuit breaker is carrying 15 A and a second distributed power source begins delivering 15 A to the same branch circuit (30 A total), the second distributed power source, in the present embodiment, sends a PLC power pulse every 2 seconds (=15 A). The branch circuit breaker will receive this PLC power pulse and recognize that additional power is on the conductor, and, as described herein, adjust the trip curve (based on 30 A total=200%) to reduce the trip time to 10 sec (as if all the power was flowing through the branch circuit breaker). In this example, the secondary power source is reporting 5 times faster than the trip time (10 sec/2 sec). If the 200% overcurrent remains, the branch circuit breaker trips and the secondary power source will also go offline (per UL1741). If the secondary power source is a backup generator or UPS, then it could continue to deliver power as long as the branch or main breaker is open (note that secondary power sources are typically current limited and also have supplementary overcurrent protection).

One particular embodiment for implementing the PLC communications of the present invention employs one-way communication from the distributed power source (DPS) to the branch circuit breaker (BCB) wherein a PLC tone indicating current is transmitted for same time period as a meter pulse as just described. This embodiment is advantageous in that is easy to implement and interpret the "standard" power signal from a distributed power source and to adjust the branch circuit breaker trip curve accordingly. Also, PLC Pulses from multiple sources are additive, so it is easy to integrate/calculate average total power. One limitation of this implementation is that one way communications do not provide acknowledgement for failsafe operation.

Figure 10:
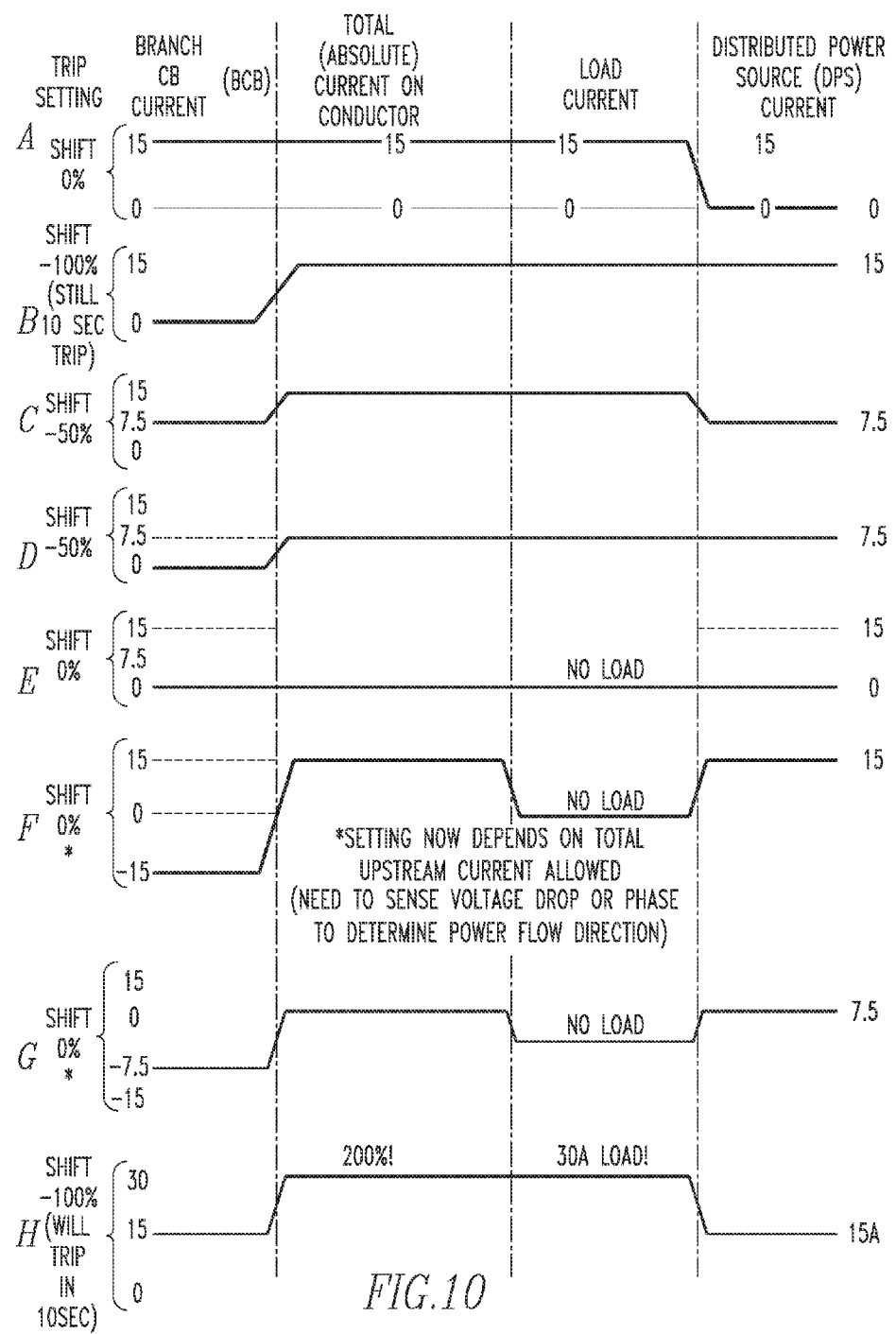
FIGS. 10-12 are schematic diagrams of PLC schemes for transmitting information used to adjust the trip characteristics of a circuit breaker according to different exemplary embodiments of the present invention.
Figure 11:
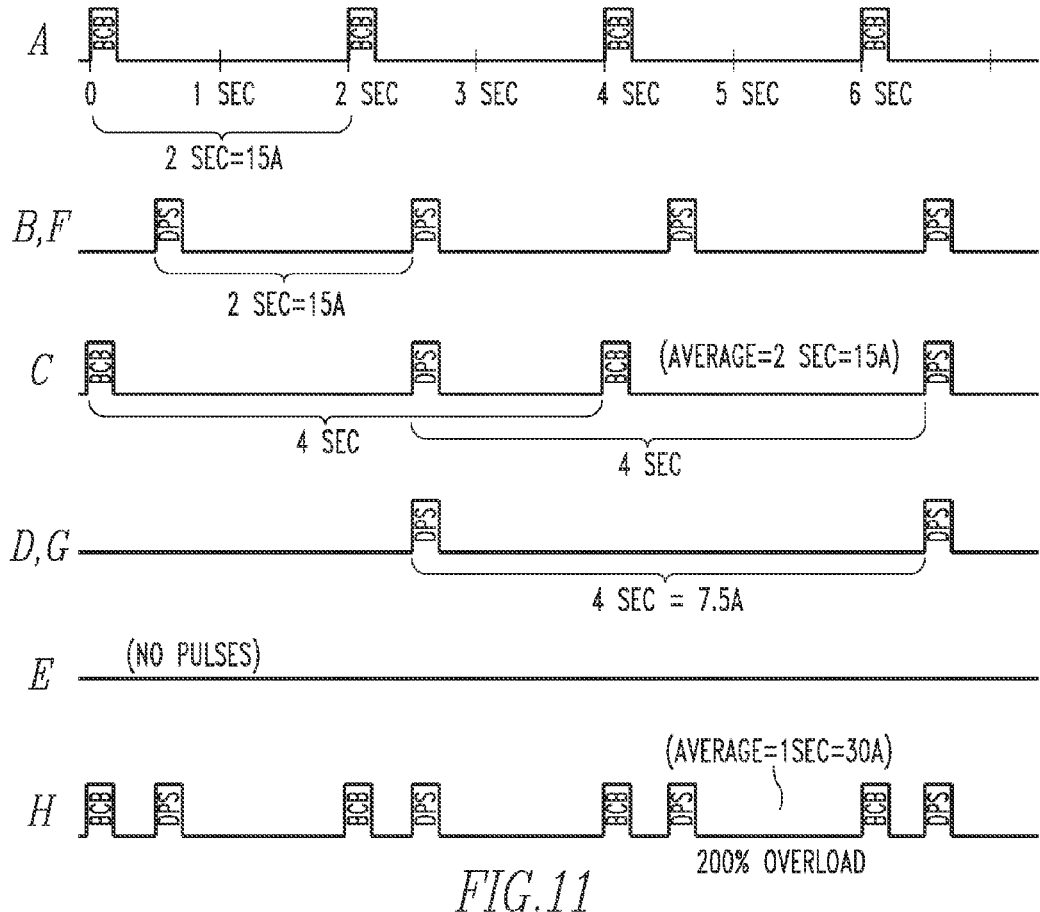

A second particular (alternative) embodiment for implementing the PLC communications of the present invention employs two-way communications from the distributed power source (DPS) to the branch circuit breaker (BCB), wherein each is structured and configured to transmit and receive PLC pulses (i.e., each includes a PLC transmitter like PLC transmitter 48 and a PLC receiver like PLC transceiver 36 or a separate receiver only device). More specifically, in this embodiment, the DPS transmits pulses (according to the meter pulse scheme described above) that indicate the current that it is generating, and the BCB transmits pulses (according to the meter pulse scheme described above) that indicate the current delivered through the BCB. In this embodiment, since the BCB transmits and receives PLC pulses, it can verify that the PLC pulse receiver is working (and can receive from other distributed power sources also). Also, because the DPS receives PLC pulses, it is able to verify that it is transmitting onto the conductor to provide a high probability that the BCB will receive PLC power pulses. In this embodiment, the average T (average time between pulses) will indicate the total current reported on the conductor (i.e., the sum of the current delivered through the BCB and the current provided by the DPS). The BCB will then adjust its trip curve based on the total current reported on the conductor minus the current delivered through the branch circuit breaker. FIGS. 10 and 11 show a number of example uses cases (labeled a through H) for this implementation, including the PLC pulses that would be generated and transmitted. In one embodiment, the DPS may be structured to display a total current on the conductor or an indication that an overcurrent condition exists with impending trip in response to receipt of the PLC pulses. One limitation of this implementation is that asynchronous transmission could result in some pulses overlapping and slightly reduce the accuracy of determining total power on conductors.

Figure 12:
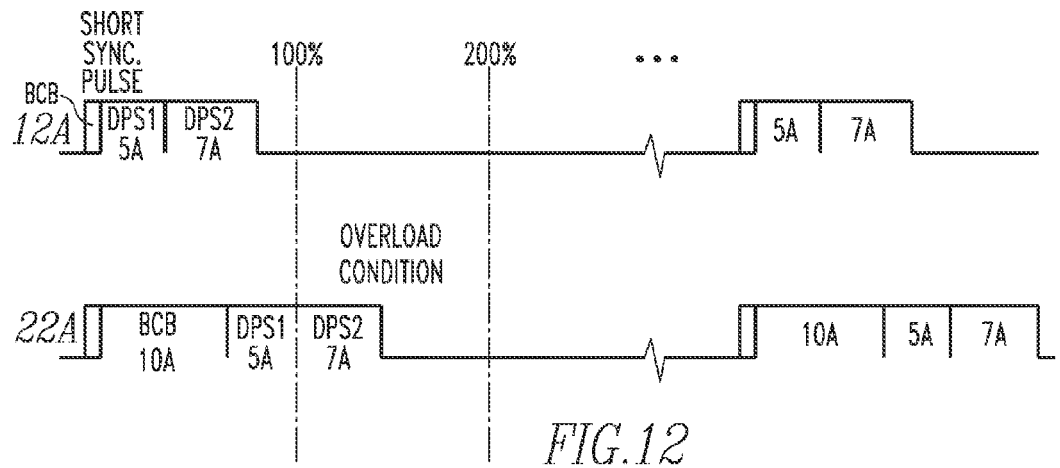

A third particular (alternative) embodiment for implementing the PLC communications of the present invention also employs two-way communications from the DPS to the BCB. In this embodiment, shown schematically in FIG. 12, PLC pulse length is transmitted by both the DPS and the BCB as a percentage of rated branch circuit conductor ampacity (which will have a corresponding reference pulse length indicating a 100% value). In other words, there will be a predetermined reference pulse length $T_{ref}$ that corresponds to the rated ampacity, and the pulse length $T_{DPS}$ or $T_{BCB}$ transmitted by each of the DPS and the BCB will be determined as follows: (current of DPS or BCB/rated ampacity)*$T_{ref}$. This embodiment is advantageous because it is easy to implement and interpret the total power on the conductor, it is scalable for different conductor sizes (and rated currents), it allows all sources (primary and secondary) to accurately report power delivered, and it allows overload currents to also be reported (warning of impending trip condition). One difficulty with this embodiment is that it requires a Carrier Sense Multiple Access/Collision Avoidance (CSMA/CA) algorithm so that the PLC pulses are concatenated (non-overlapping) in a proper manner.

In a particular implementation of either of the two "two-way communications" embodiments just described, the DPS is structured and configured such that it cannot output power without first detecting a PLC power pulse from a BCB that is a smart breaker. This is to prevent a DPS (e.g., a DPI 40 of a DPS) from being plugged into a receptacle on an existing branch circuit with a "standard" circuit breaker which cannot compensate for the current delivered by the DPS.

Finally, methods to enhance PLC signal detection are known, and include locating a capacitor (of selected value) on the upstream side of the BCB to create a low impedance path for the high frequency PLC signal so that it propagates into the PLC receiver within the BCB but does not propagate past the BCB and onto another branch circuit. There needs to also be a capacitor at a distributed power source (or smart receptacle) so that the device can also see (receive) the PLC signal.

While the embodiment described above have been described as including PV modules as the distributed power sources, it will be understood that that is meant to be exemplary only and that other distributed power source technologies, such as, without limitation, wind turbine modules, backup generators, energy storage, and uninterruptible power supplies, may also be used within the scope of the present invention.

Furthermore, in yet further alternative embodiments, the information that indicates the amount of power that the distributed power source(s) is/are generating at any given time, rather than being transmitted using PLC technology as described, may instead be transmitted using other communications technologies, such as, without limitation, short range (e.g., RF) wireless communications.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical system, comprising:
   a distributed power source device, the distributed power source device being structured to generate: (i) AC power, and (ii) a signal indicating an amount of current being produced by the distributed power source device; and
   a circuit breaker having set trip characteristics coupled to the distributed power source device by a power line, wherein the signal is superimposed on the power line, and wherein the circuit breaker is structured to receive the signal and adjust the set trip characteristics based on at least the signal by adjusting a trip curve of the circuit breaker based on at least the signal.

2. The electrical system according to claim 1, wherein the circuit breaker is a branch circuit breaker by a power line, wherein the signal is superimposed on the power line, and wherein the electrical system includes a load center including the branch circuit breaker and a branch circuit coupled to the branch circuit breaker and including the distributed power source device.

3. The electrical system according to claim 1, wherein the circuit breaker is a main circuit breaker, wherein the electrical system includes a load center including the main circuit breaker and a backfed AC source structured to generate a second signal indicating an amount of current being produced by the backfed AC source, and wherein the main circuit breaker is structured to receive the signal and the second and adjust the set trip characteristics based on at least the signal and the second signal.

4. The electrical system according to claim 1, wherein the electrical system comprises a microgrid having a distribution manager including the circuit breaker.

5. The electrical system according to claim 1, wherein the distributed power source device comprises a module structured to generate DC power coupled to an inverter structured to generate the AC power from the DC power and to generate the signal.

6. The electrical system according to claim 5, wherein the module comprises a photovoltaic module.

7. The electrical system according to claim 1, wherein the distributed power source device comprises a module structured to generate DC power, a microinverter coupled to the module and structured to generate the AC power from the DC power, and a receptacle coupled to the microinverter and structured to generate the signal.

8. The electrical system according to claim 7, wherein the signal comprises a power line carrier signal and wherein the receptacle comprises current sensing circuitry and a power line carrier transmitter.

9. The electrical system according to claim 1, wherein the signal comprises a power line carrier signal, wherein the electrical system employs two-way communications wherein the circuit breaker is structured to generate a second power line carrier signal that indicates an amount of current delivered through the circuit breaker, and wherein the circuit breaker is structured to display a total current on a branch circuit including the receptacle or an indication that an overcurrent condition exists with impending trip responsive to the first and second power line carrier signals.

10. The electrical system according to claim 1, wherein the signal comprises a power line carrier (PLC) signal.

11. The electrical system according to claim 10, wherein the electrical system employs two-way communications wherein the circuit breaker is structured to generate a second power line carrier signal that indicates an amount of current delivered through the circuit breaker, and wherein the circuit breaker is structured to adjust the set trip characteristics based the power line carrier signal and the second power line carrier signal.

12. The electrical system according to claim 11, wherein the circuit breaker is structured to generate a power line carrier signal and wherein the distributed power source device is structured to output the AC power only if it first receives the power line carrier signal from the circuit breaker.

13. The electrical system according to claim 10, wherein the circuit breaker is structured to generate a second power line carrier signal indicating an amount of current being delivered through the circuit breaker, wherein the circuit breaker is structured to adjust the set trip characteristics based on at least the power line carrier signal and the second power line carrier signal.

14. An electrical system, comprising:
    a distributed power source device, the distributed power source device being structured to generate: (i) AC power, and (ii) a signal indicating an amount of current being produced by the distributed power source device; and
    a circuit breaker having set trip characteristics coupled to distributed power source device, wherein the circuit breaker is structured to receive the signal and adjust the set trip characteristics based on at least the signal, wherein the signal comprises a power line carrier signal, wherein the circuit breaker is structured to generate a second power line carrier signal indicating an amount of current being delivered through the circuit breaker, wherein the circuit breaker is structured to adjust the set trip characteristics based on at least the power line carrier signal and the second power line carrier signal, and wherein the power line carrier signal comprises a number of first pulses and the second power line carrier signal comprises a number of second pulses, the first pulses and the second pulses comprising a plurality of total pulses, wherein an average time between adjacent ones of the total pulses indicates a total current, and wherein the circuit breaker is structured to adjust the set trip characteristics based on the total current minus the current being delivered through the circuit breaker.

15. An electrical system, comprising:
    a distributed power source device, the distributed power source device being structured to generate: (i) AC power, and (ii) a signal indicating an amount of current being produced by the distributed power source device, and
    a circuit breaker having set trip characteristics coupled to distributed power source device, wherein the circuit breaker is structured to receive the signal and adjust the set trip characteristics based on at least the signal, wherein the signal comprises a power line carrier signal, wherein the circuit breaker is structured to generate a second power line carrier signal indicating an amount of current being delivered through the circuit breaker, wherein the circuit breaker is structured to adjust the set trip characteristics based on at least the power line carrier signal and the second power line carrier signal, and wherein the distributed power source device is provided on a circuit having a rated circuit conductor ampacity and a reference pulse length $T_{ref}$ that corresponds to the rated conductor ampacity, wherein the power line carrier signal has a first pulse length and the second power line carrier signal has a second pulse length, wherein the first pulse length is determined by multiplying the reference pulse length $T_{ref}$ by a first ratio of the current being produced by the distributed power source device to the rated circuit conductor ampacity, and wherein the second pulse length is determined by multiplying the reference pulse length $T_{ref}$ by a second ratio of the current being delivered through the circuit breaker to the rated circuit conductor ampacity.

16. The electrical system according to claim 1, wherein the circuit breaker is structured to receive the signal and adjust the set trip characteristics based on at least the signal only if a forward current condition through the circuit breaker is detected, and not adjust the set trip characteristics if a reverse current condition through the circuit breaker is detected.

17. A method of adjusting trip characteristics of a circuit breaker, comprising:
receiving in the circuit breaker a signal indicating an amount of current being produced by a distributed power source device structured to generate AC power, wherein the circuit breaker is coupled to the distributed power source device by a power line and wherein the signal is superimposed on the power line; and
adjusting the trip characteristics based on at least the signal by adjusting a trip curve of the circuit breaker based on at least the signal.

18. The method according to claim 17, wherein the signal comprises a power line carrier (PLC) signal.

19. The method according to claim 18, further comprising causing the circuit breaker to generate and output to the distributed power source device a second power line carrier signal indicating an amount of current being delivered through the circuit breaker, wherein the adjusting comprises adjusting the trip characteristics based on at least the power line carrier signal and the second power line carrier signal.

20. A method of adjusting trip characteristics of a circuit breaker, comprising:
receiving in the circuit breaker a signal indicating an amount of current being produced by a distributed power source device structured to generate AC power;
adjusting the trip characteristics based on at least the signal, wherein the signal comprises a power line carrier signal; and
causing the circuit breaker to generate and output to the distributed power source device a second power line carrier signal indicating an amount of current being delivered through the circuit breaker, wherein the adjusting comprises adjusting the trip characteristics based on at least the power line carrier signal and the second power line carrier signal, wherein the power line carrier signal comprises a number of first pulses and the second power line carrier signal comprises a number of second pulses, the first pulses and the second pulses comprising a plurality of total pulses, wherein an average time between adjacent ones of the total pulses indicates a total current, and wherein the adjusting comprises adjusting the trip characteristics based on the total current minus the current being delivered through the circuit breaker.

21. A method of adjusting trip characteristics of a circuit breaker, comprising:
receiving in the circuit breaker a signal indicating an amount of current being produced by a distributed power source device structured to generate AC power;
adjusting the trip characteristics based on at least the signal, wherein the signal comprises a power line carrier signal; and
causing the circuit breaker to generate and output to the distributed power source device a second power line carrier signal indicating an amount of current being delivered through the circuit breaker, wherein the adjusting comprises adjusting the trip characteristics based on at least the power line carrier signal and the second power line carrier signal, wherein the distributed power source device is provided on a circuit having a rated circuit conductor ampacity and a reference pulse length $T_{ref}$ that corresponds to the rated conductor ampacity, wherein the power line carrier signal has a first pulse length and the second power line carrier signal has a second pulse length, wherein the first pulse length is determined by multiplying the reference pulse length $T_{ref}$ by a first ratio of the current being produced by the distributed power source device to the rated circuit conductor ampacity, and wherein the second pulse length is determined by multiplying the reference pulse length $T_{ref}$ by a second ratio of the current being delivered through the circuit breaker to the rated circuit conductor ampacity.

* * * * *